May 10, 1955  E. R. SEWELIN ET AL  2,708,134
VEHICLE CAB FLEXIBLE MOUNTING MEANS
Filed Dec. 22, 1950  2 Sheets-Sheet 1

INVENTORS
ERNEST R. SEWELIN
BRUNO J. OLENDER
Paul O. Pippel
ATT'Y

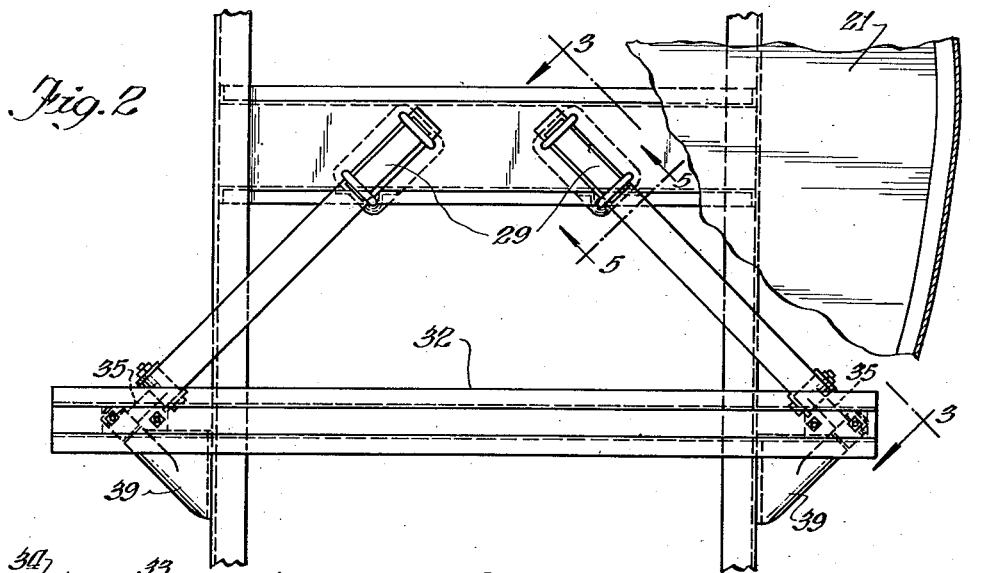
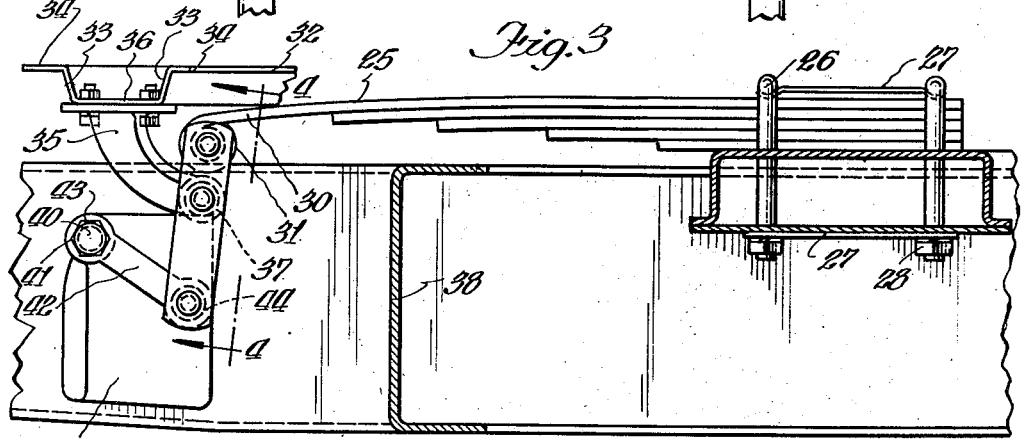

United States Patent Office 2,708,134
Patented May 10, 1955

2,708,134

VEHICLE CAB FLEXIBLE MOUNTING MEANS

Ernest R. Sewelin, Waterloo, and Bruno J. Olender, Fort Wayne, Ind., assignors to International Harvester Company, a corporation of New Jersey Application December 22, 1950, Serial No. 202,356

6 Claims. (Cl. 296—35)

This invention relates to a body mounting structure for automotive vehicles and more particularly to a new and improved vehicle cab mounting structure for trucks or the like utilizing leaf spring assemblies for permitting limited flexibility between the vehicle chassis frame and the cab.

In the operation of trucks or other vehicles designed for carrying heavy loads over an uneven terrain or road surface irregularities one or more ground engaging wheels are elevated differently from the other wheels causing the frame side sills to twist or weave. Hence, it is, customary in present day truck design and construction to provide a chassis frame which is relatively flexible and capable of relieving the torsional forces imposed on the chassis frame by the distortion of the frame side sills. While automotive engineers have effectively mitigated the damaging influence of these forces on the chassis frame by providing a flexible frame the problem of mounting the vehicle cab on the flexible frame in such a manner so as to minimize the transfer of the destructive forces to the cab has not been entirely solved. It is, therefore, the primary objective of the present invention to provide a novel cab mounting structure which allows limited relative movement between the cab and the vehicle chassis frame whereby the distorting forces and shocks to which the chassis frame is subjected to are transmitted to a lesser degree to the cab than heretofore possible.

Another object is the provision of a two point mounting structure for vehicle cabs whereby the cab may rock laterally with respect to the chassis frame about an axis parallel to the longitudinal median line of the chassis frame.

Still another object is the provision of stabilizing devices including leaf spring assemblies for yieldably resisting lateral rocking of the cab with respect to the chassis frame.

A further object is the provision of a vehicle cab mounted on a chassis frame in such a manner that it is not distorted and subsequently damaged when the chassis frame upon which it is mounted is subjected to periodic torsional forces.

A still further object is to piovtally mount the cab on the chassis frame at two longitudinally spaced points which are disposed in a vertical plane passing through the longitudinal median line of the chassis frame where distortion of the frame by deflection of the side sills is least pronounced.

Still another object is to provide a pair of leaf spring assemblies for stabilizing the vehicle cab each leaf spring assembly having one end rigidly connected to the frame adjacent the centerline of the frame and their opposite ends pivotally connected to respective opposite sides of the cab by means of floating levers.

The foregoing and other important objects and desirable features inherent in and encompassed by the invention together with many of the purposes and uses thereof will become readily apparent from a reading of the ensuing description in conjunction with the annexed drawings, in which, Figure 1 is a perspective view of the forward portion of a truck chassis frame taken from a point disposed angularly above the chassis frame;

Figure 2 is a plan view of a chassis frame incorporating the invention; a portion of the vehicle cab is cut away to better illustrate the leaf spring stabilizing devices;

Figure 3 is an enlarged, detailed view taken substantially along line 3—3 of Figure 2;

Figure 4 is an enlarged sectional view taken substantially along line 4—4 of Figure 3; and Figure 5 is a detailed view taken substantially along line 5—5 of Figure 2.

Figure 1:
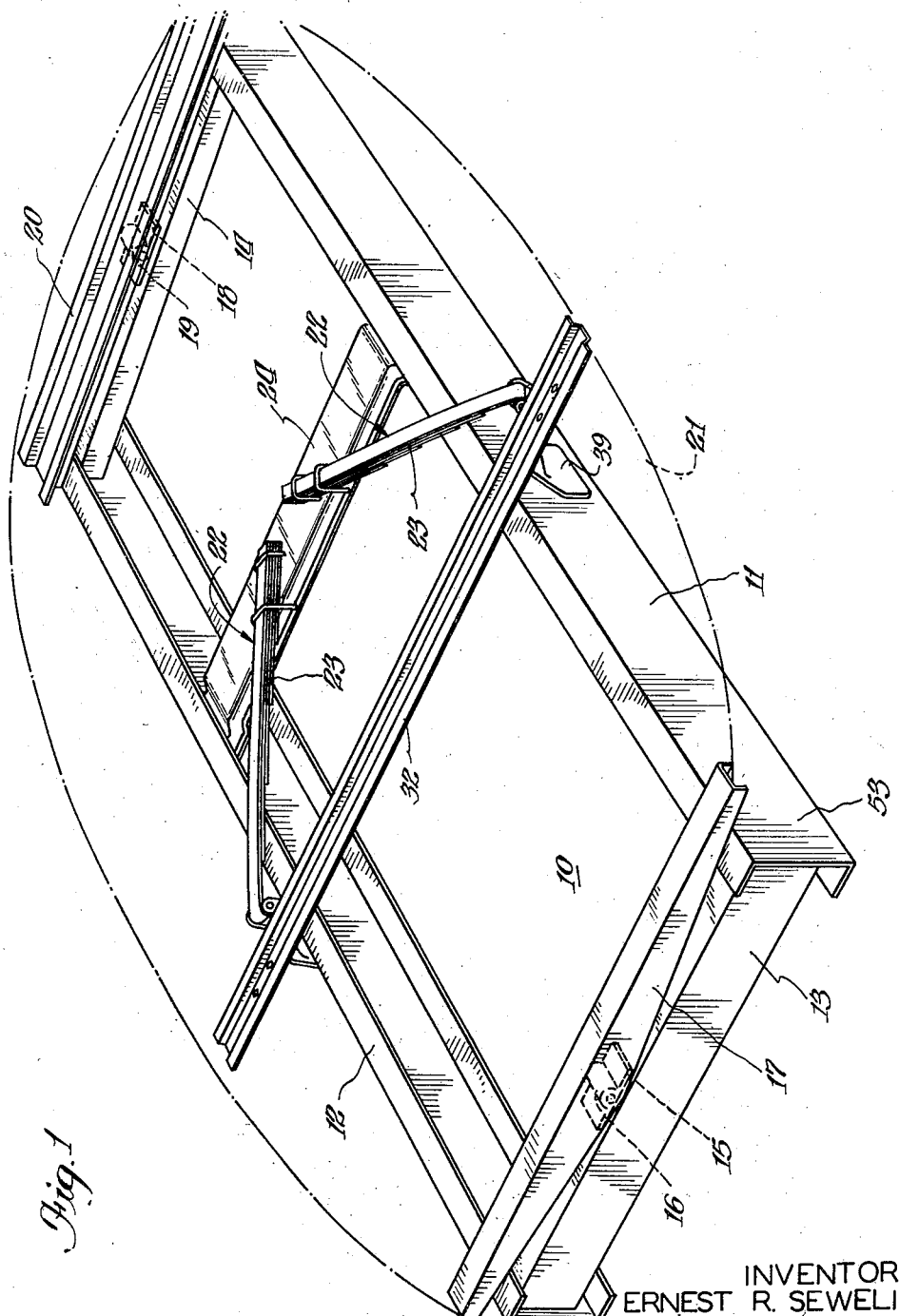

Referring to the drawings in which like reference characters designate like elements throughout the various views there is shown the forward portion of a truck chassis frame 10. The chassis frame 10 comprises a pair of longitudinally extending, transversely spaced side sill members 11 and 12 having the conventional U-shaped form interconnected by a plurality of longitudinally spaced, transversely disposed cross members 13 and 14.

The forward cross member 13, as shown somewhat diagrammatically in Figure 1, has a bracket member 15 rigidly secured thereto midway between the side sill members 11, 12. The bracket member 15 has a longitudinally extending bearing portion 16 to which the central section of the forward U-shaped cab cross member 17 is pivotally connected. The outline of the sheet metal portion of the vehicle cab is shown in broken lines in Figure 1.

The rearward cross member 14, as shown in Figure 1, rigidly supports a bracket member 18 which has a bearing portion 19 in longitudinal alignment with the bearing portion 16 of bracket member 15. A central section of the rearward cab cross member 20 is pivotally connected to the bearing portion 19 by any suitable means. The floor panel 21, shown partially in Figure 2, is secured to the cab cross members 17 and 20. It will be obvious from the above described structure that the bracket members 15 and 18 and their associated parts provide a longitudinal pivot axis for the entire vehicle cab, including the forward and rearward cab cross members 17 and 20, which is vertically spaced above the longitudinal median line of the chassis frame 10 and below the center of gravity of the cab.

Inasmuch as the vehicle cab is mounted for oscillation on a generally horizontal and longitudinal axis resilient means are provided for stabilizing the cab and for preventing excessive rocking of the same. The illustrated stabilizing devices, designated generally by numeral 22, are in the form of leaf spring packs or assemblies 23 symmetrically disposed on each side of the chassis frame 10. In view of the fact that both stabilizing devices 22 are structurally and functionally the same only the stabilizing structure on one side of the vehicle chassis frame 10 will be described in detail.

Longitudinally spaced between the forward and rearward cross members 13 and 14 is a transversely extending intermediate cross member 24 having a box section as best shown in Figure 5. Intermediate cross member 24 is rigidly connected to the side sill members 11, 12 by any suitable means. The stabilizing device 22 positioned along side sill member 11 includes a plurality of flat spring leaves 25 of varying lengths. The spring leaves 25 are clamped together in their assembled relationship by means of a pair of U-bolts 26, abutment plates 27, and the nuts 28. The U-bolts 26 also serve to rigidly connect one end 29 of the leaf spring assembly 23 to the intermediate cross member 24. The leaf spring assembly 23 diverges outwardly and extends beyond the side sill member 11. The free end 30 of the uppermost leaf 25 of the leaf spring assembly 23 is rolled over to form a bearing portion 31, as best shown in Figures 3 and 4.

A third transversely extending vehicle cab cross member 32 longitudinally spaced between the forward and rearward cab cross members 17 and 20 is rigidly connected to the floor panel 21. The cross member 32 is channel-shaped, the legs 33 thereof being provided with flanges 34 for attachment to the underside of the cab and to strengthen the member. A curved, downward depending bracket member 35, rigidly attached to the web portion 36 of the cross member 32 adjacent the end thereof, is provided with a bearing portion 37.

Attached to the vertical web portion 38 of the side sill member 11 by any suitable means is a bracket member 39 provided with a pivot pin 40 for pivotally supporting one end 41 of a guide link 42. A nut 43 threaded on the pivot pin 40 prevents displacement of the link 42 from the pivot pin. The opposite end 44 of the link 42 is pivotally connected to the lowermost end 45 of a floating member 46. The member 46 includes a pair of spaced plates 47, 48 interconnected by means of three pivot pins 49, 50, 51. Encircling each pivot pin 49, 50, 51 are rubber bushings or insulators 52. The bearing portion 31 of the leaf spring assembly 23 is positioned on the uppermost pivot pin 49 and engages the rubber bushing 52 associated therewith rather tightly whereby the bushing is incapable of slipping with respect to the bearing portion. Bearing portions 37 and 44 are pivotally connected to pivot pins 50, 51, respectively, in a like manner. It will be obvious that the utilization of rubber bushings interposed between the pivot pins and bearing portions as noted above effectively insulate the parts and allows a limited pivotal relative movement therebetween by deformation of the rubber bushings.

In normal operation of the truck over a comparatively level and smooth road bed the chassis frame twist is practically non-existent. The entire weight of the vehicle cab is supported by the forward and rearward frame cross members 13 and 14. The cab is maintained in a relatively fixed upright position with respect to the chassis frame 10 by the stabilizing devices 22. Twisting of the chassis frame 10 whereby one end of one of the side sill members is raised with respect to the other side sill member is effectively accommodated without imposing severe damaging strains on the sheet metal parts of the vehicle cab structure. As an example, if the forward end, indicated by numeral 53, of the side sill member 11 is suddenly displaced vertically, upwardly with respect to the side sill member 12 the resulting force is not transmitted to the vehicle cab structure to torsionally distort the same. Bracket member 15 and the bearing portion 16 are raised a proportionately smaller distance by the displacement of the forward end 53 of the sill member 11 since they are spaced inwardly of the sill member 11. Inasmuch as bracket member 15 is in longitudinal alignment with the rear cab mounting structure and both the forward and rear cab mounting structures lie within a vertical plane containing the longitudinal median line of the chassis frame 10 substantial relative rocking movement between the vehicle cab and the chassis frame is permitted without materially distorting the vehicle cab. Movement of the side sill member 11 relatively upwardly toward the vehicle cab structure is resiliently resisted by the leaf spring assembly 23 positioned along sill member 11. It will be obvious that a minimum amount of road shock is transmitted to the cab structure by mounting the vehicle cab as described above. The damaging forces are effectively dissipated by the leaf spring assemblies 23. Once the vehicle has passed over the road bed irregularity the vehicle cab assumes its normal upright steadied position.

The embodiment of the invention chosen for the purposes of illustration and description herein is that preferred for achieving the objects of the invention and developing utility thereof in the most desirable manner. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. In a motor vehicle having a longitudinal frame and a body, the combination including said frame and body comprising means for connecting said body to said frame for controlled relative movement therebetween comprising means pivotally securing the longitudinally spaced opposite ends of said body to said frame whereby said body is capable of rocking laterally with respect to said frame about a longitudinal axis vertically spaced above said frame; and means for yieldably resisting rocking of the body with respect to the frame including a pair of leaf spring assemblies, said leaf spring assemblies each having one end rigidly connected to said frame and having their opposite ends terminating adjacent the respective opposite sides of said frame; and means interconnecting the free ends of said spring assemblies with respective opposite sides of said body and said frame including a pair of members, each member having one end pivotally connected to the free end of one of said leaf spring assemblies, an intermediate portion pivotally connected to a respective side of said body, and means interconnecting the opposite end of each member to a respective side of said frame whereby said members are capable of vertical and horizontal movement with respect to said frame 2. The combination substantially as set forth in claim 1, in which said means interconnecting the opposite end of each member to respective side of said frame includes a pair of links, each link being pivotally connected to said frame and a respective member.

3. In a motor vehicle having a frame comprising a pair of longitudinally extending, transversely spaced sill members interconnected by a pair of longitudinally spaced cross members; a vehicle body; means for supporting said body on said frame comprising first means pivotally connecting the forward end of said body to one of said cross members, said means being spaced substantially midway between said sill members; second means pivotally connecting the rearward end of said body to the other of said cross members, said second means being in longitudinal alignment with said first means whereby said body is capable of rocking laterally with respect to said frame; means for yieldably resisting rocking of the body with respect to the frame including a pair of leaf spring assemblies, said leaf spring assemblies each having one end rigidly connected to said frame at a point longitudinally spaced between said cross members, said leaf spring assemblies extending divergingly and having their opposite ends terminating adjacent respective sill members; and means interconnecting the free ends of said leaf spring assemblies with respective opposite sides of said body and frame including a pair of members, each member having one end pivotally connected to the free end of one of said leaf spring assemblies, an intermediate portion pivotally connected to a respective side of said body, and means interconnecting the opposite end of each member to a respective side of said frame whereby said members are capable of vertical and horizontal movement with respect to said frame.

4. In a motor vehicle having a longitudinal frame and a body, the combination including said frame and body comprising means for supporting said body on said frame for controlled relative movement therebetween including at least one supporting pivotal connection between said body and frame whereby said body is capable of rocking laterally with respect to said frame, said pivoted connection being disposed in a vertical plane passing through the longitudinal median line of said frame; a pair of oppositely disposed resilient stabilizing devices arranged on the respective sides of said frame and below said body including a pair of leaf spring means supported on said frame for yieldably resisting rocking of the body with respect to said frame; and means for connecting said leaf spring means with respective opposite sides of said body and frame, said means including a pair of members longitudinally spaced from said pivotal connection, each member having one end pivotally connected to one of said leaf spring means, an intermediate portion pivotally connected to a respective side of said body, and means interconnecting the opposite end of each member to a respective side of same frame whereby said members are capable of vertical and horizontal movement with respect to said frame.

5. A cab mounting for an automotive vehicle having a longitudinal frame including laterally spaced side frame members, a cab mounted above the frame, a first frame cross member connecting said side frame members at the rear of the cab, and a second frame cross member connecting said side frame members at the front of the cab comprising, a rear mounting connection between the rear of said cab and said first frame cross member for pivotal movement on a longitudinal axis intermediate the side frame members; a front mounting connection between the front of said cab and said second frame cross member, said front mounting connection being in substantially longitudinal alignment with said rear mounting connection, said mounting connections permitting limited oscillation of the cab about a longitudinal axis substantially under the center of gravity of the cab; a third frame cross member connecting said side frame members, said third frame cross member being longitudinally spaced between said first and second frame cross members; and resilient stabilizing means disposed on each side of said frame for yieldably resisting oscillation of the body with respect to said frame, said stabilizing means including a pair of leaf spring assemblies extending convergingly toward said rear mounting connection and being rigidly secured to said third frame cross member; and means for connecting said leaf spring assemblies to respective opposite sides of said body at points laterally spaced from the oscillation axis and longitudinally spaced from said front and rear mounting connections including a pair of members, each member having one end pivotally connected to one of said leaf spring assemblies, an intermediate portion pivotally connected to a respective side of said body, and means interconnecting the opposite end of each member to a respective side of said frame whereby said members are capable of vertical and horizontal movement with respect to said frame.

6. A cab mounting substantially as set forth in claim 5, in which said means interconnecting said members to said frame include a pair of links, each link being pivotally connected to said frame and a respective member.

References Cited in the file of this patent

UNITED STATES PATENTS

| | | |
|---|---|---|
| 914,111 | Buckwalter | Mar. 2, 1909 |
| 1,209,716 | King | Dec. 26, 1916 |
| 1,439,802 | De Miranda | Dec. 26, 1922 |
| 1,936,318 | Windberger | Nov. 21, 1933 |
| 2,142,173 | Broluska | Jan. 3, 1939 |
| 2,152,573 | Turner | Mar. 28, 1939 |
| 2,564,888 | Foley et al. | Aug. 21, 1951 |
| 2,639,186 | Sewelin | May 19, 1953 |

FOREIGN PATENTS

| | | |
|---|---|---|
| 513,667 | Great Britain | Oct. 18, 1939 |